United States Patent [19]

Hochstrasser

[11] Patent Number: 4,915,352
[45] Date of Patent: Apr. 10, 1990

[54] SEALING ARRANGEMENT HAVING AN ANNULAR ELASTICALLY DEFORMABLE SEAL AND EMPLOYMENT OF SUCH SEALING ARRANGEMENT

[75] Inventor: Ferdinand Hochstrasser, Auenstein, Switzerland

[73] Assignee: KWC AG, Unterkulm, Switzerland

[21] Appl. No.: 299,604

[22] Filed: Jan. 23, 1989

[30] Foreign Application Priority Data

Jan. 27, 1988 [CH] Switzerland .............................. 280/88

[51] Int. Cl.$^4$ ................................................ F16K 3/02
[52] U.S. Cl. ..................................... 251/175; 251/171; 277/138
[58] Field of Search ................ 251/171, 172, 174, 175, 251/180, 181, 185, 192, 304; 277/138, 157, 206

[56] References Cited

U.S. PATENT DOCUMENTS

| | | |
|---|---|---|
| 4,501,408 | 2/1985 | Pawelzik et al. |
| 4,522,412 | 6/1985 | Kubo .................................. 277/138 |

FOREIGN PATENT DOCUMENTS

| | | | |
|---|---|---|---|
| 493618 | 6/1953 | Canada ................................ 251/125 |
| 0071779 | 2/1983 | European Pat. Off. . |
| 1180610 | 6/1959 | France . |
| 2495266 | 6/1982 | France . |
| 651365A5 | 9/1985 | Switzerland . |

*Primary Examiner*—John Fox
*Attorney, Agent, or Firm*—Barnes & Thornburg

[57] ABSTRACT

The sealing arrangement comprises a seal having end sealing surfaces. The one end sealing surface bears against an annular sealing surface of a valve seat screwed into a lower part of a water faucet. The other end sealing surface presses upon a non-rotatable disk which bears against a rotary disk. The seal comprises radially outwardly projecting supporting ribs in the region of the end sealing surfaces. These supporting ribs are supported at a supporting ring of a housing of a ceramic upper part or portion. A slit spring washer bears against the seal at the inner or internal side thereof. With this sealing arrangement it is rendered possible that the seal has to be fitted into the water faucet with only a small bias or loading, because the seal efficiently utilizes the water pressure and converts or transforms such water pressure into a force which presses the end sealing surfaces with greaater compression or pressure against the annular sealing surface and the non-rotatable disk, respectively.

9 Claims, 1 Drawing Sheet

SEALING ARRANGEMENT HAVING AN ANNULAR ELASTICALLY DEFORMABLE SEAL AND EMPLOYMENT OF SUCH SEALING ARRANGEMENT

CROSS-REFERENCE TO RELATED APPLICATIONS

This application is related to the commonly assigned, copending U.S. Pat. Application Ser. No. 07//246,750, filed Sept. 20, 1988, entitled "FLUID MIXING DEVICE, IN PARTICULAR HOT AND COLD WATER MIXING DEVICE" and U.S. Pat. Application Ser. No. 07/299,478 filed Jan. 23, 1989, entitled "ROTARY-SLIDE FAUCET".

BACKGROUND OF THE INVENTION

The present invention broadly relates to a sealing arrangement and, more specifically, to a new and improved sealing arrangement having an annular, elastically deformable seal. The present invention also relates to the employment of such a new and improved sealing arrangement.

Generally speaking, the sealing arrangement of the present invention comprises an annular elastically deformable seal having end sealing surfaces, through which seal a free-flowing medium, in particular water, flows.

Such sealing arrangements are known, for example, from the manufacture of fittings and fixtures as well as from the installation and plumbing work for water distribution plants in houses, buildings and the like. Sealing arrangements can be employed or utilized wherever two openings aligned to each other in the direction of flow, such two openings being limited or defined by the sealing surfaces arranged parallel to each other, have to be sealed.

In such sealing arrangements known to the art there are normally employed 0-rings or annular seals having, for example, a rectangular cross-section, the end sealing surfaces of which bear at the sealing surfaces limiting the two openings. In such sealing arrangements the seal must be held under a considerable pressure exerted in the axial direction in order that the end sealing surfaces adequately and sufficiently seal.

Annular lip seals are also known by means of which good sealing conditions can be achieved even at relatively small axial biasing forces. These lip seals possess inwardly projecting thin-walled lips which are arranged in the region of the end surfaces or end faces and are pressed, depending on the pressure of the medium, against the sealing surfaces which limit or define the two openings.

Water faucets are also known which comprise a lower part and an upper part, such upper part being screwed or threaded, up to a stop or detent, into this lower part. In the upper part there is non-rotatably arranged a disk or plate having a throughpass opening, and a rotary disk also provided with a throughpass opening is rotatably mounted to bear at the non-rotatable disk or plate. The rotary disk is rotatable by means of an actuating element such that the throughpass opening of the rotary disk can be brought into and out of an overlapping relationship with the throughpass opening of the non-rotatable disk or plate. As viewed in the direction of flow of the medium, there is arranged upstream of the non-rotatable disk or plate an annular seal having a rectangular cross-section. This annular seal bears with the one end sealing surface thereof at the non-rotatable disk or plate and is supported with its other end sealing surface at a sealing surface of the lower part. The annular seal must now be able to compensate for manufacturing tolerances of the distance or spacing between the non-rotatable disk or plate and the sealing surface of the lower part. On the other hand, even in the case of the largest possible spacing or distance, the annular seal must be so strongly compressed that the non-rotatable disk or plate is pressed against the rotary disk with a sufficiently large force in order that the closed faucet is tight or leak-proof. This requires a dimensioning of the annular seal which, in the case of a minimum distance between the non-rotatable disk or plate and the sealing surface of the lower part, could lead to a permanent deformation of the annular seal made of rubber. Furthermore, the non-rotatable disk or plate is thereby pressed against the rotary disk by means of a force far greater than actually necessary. This can lead to a mutual pitting or erosion between the rotary disk and the non-rotatable disk or plate, such that the functional efficiency of the faucet is no longer ensured.

SUMMARY OF THE INVENTION

Therefore, with the foregoing in mind, it is a primary object of the present invention to provide a new and improved sealing arrangement which does not exhibit the aforementioned drawbacks and shortcomings of the prior art.

A further significant object of the present invention aims at providing a new and improved sealing arrangement which can compensate for large tolerance differences and variations at the smallest possible permanent deformation and which possesses good sealing qualities in spite of small or slight axial bias or loading.

Yet a further significant object of the present invention aims at providing a new and improved sealing arrangement which is simple in construction and design, economical to manufacture, extremely reliable in operation, not readily subject to malfunction and requires a minimum of maintenance and servicing.

Now in order to implement these and still further objects of the invention, which will become more readily apparent as the description proceeds, the sealing arrangement as contemplated by the present invention, among other things, is manifested by the features that the sealing arrangement comprises circumferential supporting ribs arranged in the regions of the end sealing surfaces and projecting outwardly in radial direction. A supporting or support ring is provided and at which the supporting ribs of the seal are supported. There is further provided an inner ring which bears at the internal side of the seal.

In such a sealing arrangement the annular elastically deformable seal can be mounted or fitted with a relatively small axial bias. The pressure exerted by the medium at the internal side of the annular seal is transformed or converted into an axial force on account of the outwardly projecting supporting ribs supported at the supporting ring, with the result that the end sealing surfaces of the annular seal bear against the corresponding or associated sealing surfaces with a surface or contact pressure which is dependent on the pressure of the medium. This also leads to or brings about a negligibly slight, permanent deformation, because the surface or contact pressure of the end sealing surfaces need not be provided by biasing the elastic material of the annular seal, but is rather generated by the pressure of the medium. The inner ring advantageously ensures a positive pressing action of the end sealing surfaces, even at very small or low pressures or at underpressure or pressure below atmospheric.

The operation of the aforedescribed sealing arrangement is even further improved in that the supporting ribs together with the supporting ring embracing the supporting ribs enclose an air cushion or buffer. Due to the pressure of the free-flowing medium exerted at the internal side of the annular seal, the pressure in the air cushion or buffer is increased. Thus, in turn, the surface or contact pressure of the end sealing surfaces is additionally increased or raised in proportion to the pressure of the medium.

In a preferred constructionally simple embodiment of the invention, the circumferentially extending supporting ribs define a substantially V-shaped or U-shaped circumferential groove and the internal side of the annular seal comprises an essentially cylindrical surface. It is also conceivable that the inner ring is constructed to be resilient and thus could have the form of a slit spring washer.

Due to the static water pressure prevailing when the rotary-slide faucet is closed, the surface or contact pressure at the end sealing surfaces and thus also at the superjacently aligned rotary disk and non-rotatable disk or plate bearing against each other is at a maximum. As soon as the faucet is slightly open, the water pressure decreases, thus causing an immediate reduction of the surface or contact pressure at the end sealing surfaces as well as at the rotary disk and non-rotatable disk or plate bearing against each other. This prevents a pitting or erosion of the rotary disk and the non-rotatable disk or plate and nevertheless ensures a good sealing or watertightness. Furthermore, large tolerances can be compensated for because the minimum required bias or loading is extremely small.

BRIEF DESCRIPTION OF THE DRAWINGS

The invention will be better understood and objects other than those set forth above will become apparent when consideration is given to the following detailed description thereof. Such description makes reference to the annexed drawings wherein throughout the various figures of the drawings, there have been generally used the same reference characters to denote the same or analogous components and wherein.

DETAILED DESCRIPTION OF THE PREFERRED EMBODIMENT

Describing now the drawings, it is to be understood that in order to simplify the illustration thereof, only enough of the construction of the exemplary embodiment of sealing arrangement has been shown therein for those skilled in the art to readily understand the underlying principles and concepts of the invention.

Figure 1:
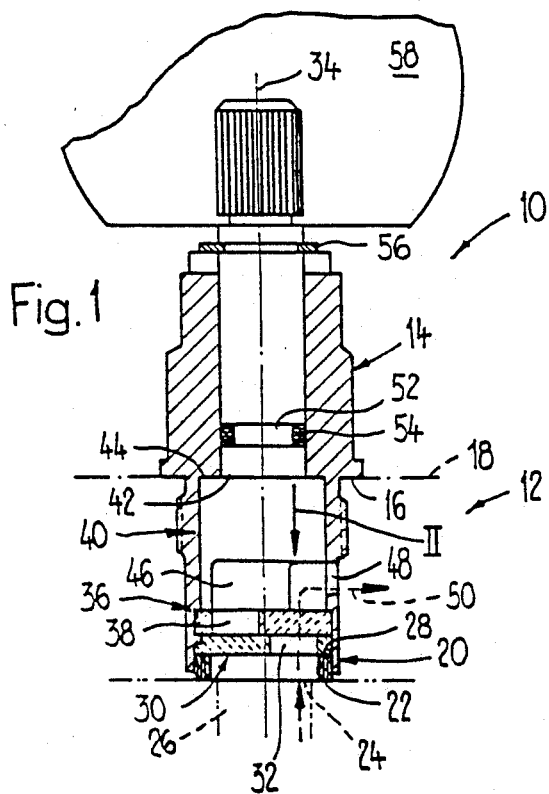
FIG. 1 schematically shows a ceramic upper part of a known faucet in a sectional view taken substantially along the axis of rotation of an actuating member.

Turning attention now specifically to FIG. 1, the faucet illustrated therein by way of example and not limitation, will be seen in a longitudinal section to comprise a ceramic upper part or portion 10 of a water faucet which is screwed or threaded into a lower part or portion 12 indicated by dash-dot lines. A housing 14 of the ceramic upper part or portion 10 comprises a stop 16 which abuts at a top or upper side 18 of the lower part or portion 12.

In the lower end region of the ceramic upper part or portion 10 there is provided an annular seal 20 having a rectangular cross-section. This annular seal 20 protrudes or projects downwardly beyond the housing 14. One end sealing surface 22 of the annular seal 20 bears against an annular sealing surface 24 of the lower part or portion 12 which limits or defines a feed or inflow inlet 26 for the medium, especially water. The other end sealing surface 28 of the annular seal 20 presses against a disk or plate 30 non-rotatably mounted in the housing 14, such disk or plate 30 being formed of ceramic material and comprising an eccentrically arranged throughpass opening or throughpassage 32. This disk or plate 30 bears against a rotary disk or plate 36 which is rotatably mounted for rotation about an axis 34, such rotary disk or plate 36 being formed of ceramic material and also comprising an eccentrically arranged throughpass opening or throughpassage 38. The rotary disk or plate 36 is rigidly or positively connected for rotation with an actuating member or actuator 40, which by means of a stop surface or face 42 is supported at a shoulder 44 of the housing 14 against the force or pressure of the annular seal 20.

In the region of the rotary disk or plate 36 there is provided a deflecting recess 46 in the actuating member or actuator 40 in order to route or conduct the water flowing through the feed inlet 26 and the two throughpass openings or throughpassages 32 and 38 to a discharge opening or outlet 48 arranged in the housing 14. The direction of water flow is indicated by an arrow 50 in broken lines.

Above the stop surface or face 42 there is provided in the actuating member or actuator 40 a circumferential seal groove or slot 52 in which an 0-ring seal 54 is arranged. The actuating member or actuator 40 is secured against displacement in the direction of the axis 34 by means of a Seeger circlip 56 or the like. In the upper end region, a rotary knob or cap 58 is seated at the actuating member or actuator 40.

Figure 2:
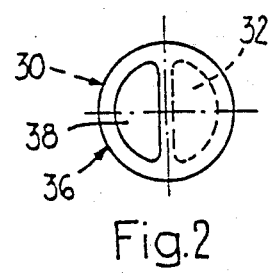
FIG. 2 schematically shows a view of the superjacently or superimposed aligned ceramic disks bearing against one another in the closed position of the faucet as viewed in the direction of the arrow II in FIG. 1.
Figure 3:
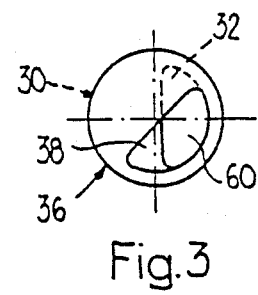
FIG. 3 is essentially the same view of the ceramic disks as in FIG. 2 and shows the upper disk rotatably displaced relative to the lower disk in a partially opened position of the faucet.

FIGS. 2 and 3 show the rotary disk or plate 36 and the disk or plate 30, as viewed in the direction of the arrow II in FIG. 1, in a closed and a partially opened position, respectively, of the water faucet. In FIG. 2, the two throughpass openings or throughpassages 32 and 38 do not overlap, so that the flow of water in the direction of the arrow 50 shown in FIG. 1 is interrupted or shut off. In FIG. 3, the rotary disk or plate 36 is shown in a position which is angularly offset relative to its position in FIG. 2 so that the two throughpass openings or throughpassages 32 and 38 partially overlap and thus clear or release a sectional area of flow 60 for the medium or water.

Since the spacing or distance between the top or upper side 18 of the lower part or portion 12 and the annular sealing surface 24 of the lower part or portion 12, as well as the ceramic upper part or portion 10 are subject to manufacturing tolerances, the annular seal 20 is differently or variably compressed when the ceramic upper part or portion 10 is screwed into the lower part or portion 12 until the stop 16 bears against the upper part or portion 18. The difference of the pressing action can exceed 0.5 millimeters. The annular seal 20 must therefor be dimensioned such that, even at minimum compression or pressing action, the disk or plate 30 presses against the rotary disk or plate 36 with a predetermined or predeterminate minimum force, in order to ensure or guarantee a drip-proof or leak-free interruption of the water flow. This results in the fact that, in the case of maximum compression of the annular seal 20, the disk or plate 30 is pressed against the rotary disk or plate 36 with a considerably greater force or pressure, and this can lead to pitting or erosion of the disk or plate 30 at the rotary disk or plate 36 and thus to functional inefficiency of the water faucet. Furthermore, the maximum compression or pressing action can lead to a permanent deformation in addition to the deterioration or deformation on aging. It should be noted that the disk or plate 30 is loaded by the static pressure of the water when the faucet is closed and this additionally increases a pitting or erosion of the disk or plate 30 at the rotary disk or plate 36.

Figure 4:
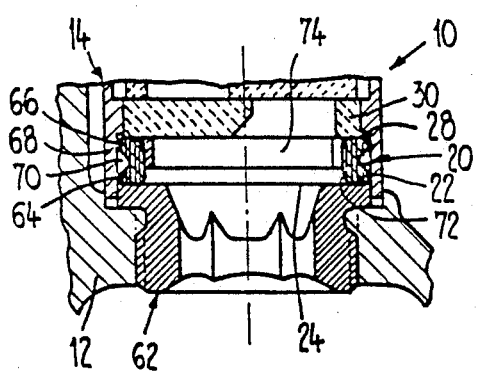
FIG. 4 schematically shows, in a sectional view and on an enlarged scale, a first exemplary embodiment of the sealing arrangement constructed according to the invention and employed in the faucet according to FIG. 1.
Figure 5:
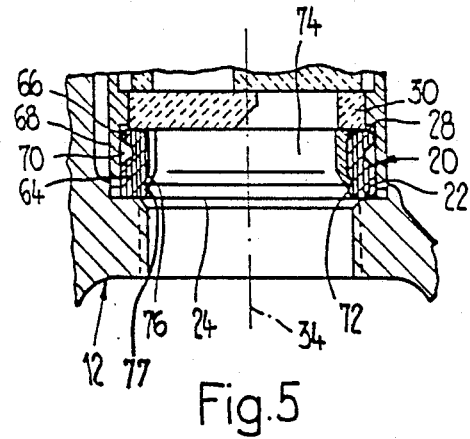
FIG. 5 schematically shows, in a sectional view and on an enlarged scale, a second exemplary embodiment of the sealing arrangement constructed according to the invention and employed in the faucet according to FIG. 1.

Two possible exemplary embodiments of a sealing arrangement, which is constructed according to the invention and solves the aforedescribed problems of seals known to the art, are shown in FIGS. 4 and 5. These FIGS. 4 and 5 illustrate, on an enlarged scale, the region of or about the annular seal 20 of FIG. 1.

A valve seat 62 having the annular sealing surface 24 is screwed into the lower part or portion 12 shown in FIG. 4. One end sealing surface 22 of the annular seal 20 bears against the annular sealing surface 24. The other end sealing surface 28 of the annular seal 20 presses against the rotary disk or plate 30. In the region of the end sealing surfaces 22 and 28, the annular seal 20 comprises circumferential supporting ribs 64 and 66 which outwardly project in radial direction. These supporting ribs 64 and 66 are supported at a supporting or back-up ring 68 formed at the housing 14 of the ceramic upper part or portion 10. These supporting ribs 64 and 66 also define or limit a V-shaped circumferential groove 70 and, together with the supporting or back-up ring 68, enclose an air cushion or buffer. On the internal or inner side, the annular seal 20 is provided with a substantially cylindrical surface 72 which is rounded in the regions of the end sealing surfaces 22 and 28, respectively. A slit spring washer 74 bears against the cylindrical surface 72.

The sealing arrangement according to FIG. 5 is very similar to the sealing arrangement according to FIG. 4. In this FIG. 5, the annular sealing surface 24 is formed at the lower part or portion 12. The one end sealing surface 22 of the annular seal 20 bears against this annular sealing surface 24, while the other end sealing surface 28 again presses against the disk or plate 30. Here again, the circumferentially extending, radially and outwardly projecting supporting ribs 64 and 66 bear against the supporting or back-up ring 68. It is to be noted that the supporting rib 64 is structured or formed in the direction of the axis 34 to be broader or higher than the corresponding supporting rib 64 of the annular seal 20 of FIG. 4. The supporting or back-up ring 68 embraces the supporting rib 64 up to approximately the central region thereof. The internal or inner cylindrical surface 72 comprises a detent or latching groove 76 limited by a detent lug 77 for the slit spring washer 74. The end of the slit spring washer 74, which end is remote from the detent groove 76, bears against the disk or plate 30.

Having now had the benefit of the foregoing description of the exemplary embodiments of sealing arrangement, there will now be described the operation thereof which is as follows:

the annular seals 20 are dimensioned such that, at the minimum compression given by the manufacturing tolerances of the faucet, they press with a very small force against the annular sealing surface 24 and the disk or plate 30, respectively. The slit spring washer 74 thus presses the supporting ribs 64 and 66 against the supporting or back-up ring 68 and ensures that the supporting ribs 64 and 66 bear against the supporting or back-up ring 68 even in the case of possible interruption of the water flow.

The supporting ribs 64 and 66 divert or deflect the force exerted by the slit spring washer 74 against the annular seal 20 in the direction of the axis 34, so that the pressing force or pressure at the end sealing surfaces 22 and 28 have to be supplied or provided not only by compression or pressing of the elastically deformable annular seal 20. If water pressure prevails, the supporting ribs 64 and 66 are pressed against the supporting or back-up ring 64 with a correspondingly greater force or pressure. The deflection of force in the annular seal 20 causes the force, with which the end sealing surfaces 22 and 28 are pressed against the annular sealing surface 24 and the disk or plate 30, respectively, to increase substantially in proportion to the pressure of the water.

Owing to the deformation of the annular seal 20, the air cushion in the circumferential groove 70 is also slightly compressed, with the result that the pressing force or action at the end sealing surfaces 22 and 28 is once again increased. In summarizing the operation of the sealing arrangement, it can be concluded that the pressing force or pressure on the end sealing surfaces 22 and 28 are substantially made up of a constant, relatively small portion or part caused by the bias or loading during the installation of the faucet and a portion or part proportional to the water pressure.

Since the annular seal 20 itself must provide or supply only a very small pressing force or pressure on the end sealing surface 22 and 28, the annular seal 20 can be dimensioned such that, at maximum possible compression due to manufacturing tolerances, the annular seal 20 is not subject to any permanent deformation except for deterioration or deformation on aging. Furthermore, the disk or plate 30 is pressed against the rotary disk or plate 36 with a force or pressure which is substantially smaller if compared with water faucets known to the art, with the result that the risk or danger of pitting or erosion is substantially reduced. Moreover, it should be noted that in the proposed sealing arrangement the force on the disk or plate 30 is reduced as soon as water begins to flow, because the annular seal 20 reacts to the difference between the static and the dynamic water pressure, with the result that the danger or risk of pitting or erosion is again reduced.

For those skilled in the art it is obvious that the supporting ribs 64 and 66 are dimensioned in such a manner that they do not buckle or bend under the water pressure. The supporting ribs 64 and 66 can also possess a form quite different from that shown in FIGS. 4 and 5 and can also have, for example, a substantially U-shaped circumferential groove.

The inner ring must not necessarily be formed as a spring washer 74. It must only ensure that the supporting ribs 64 and 66 bear at the supporting or back-up ring 68 even in the case of underpressure or pressure below atmospheric. On the other hand, a spring washer has the advantage that the water pressure can be better exploited, because the diameter of the spring washer 74 is adjustable. The inner ring or spring washer 74 can be held also by means of detent or latching lugs provided at the annular seal 20.

The sealing arrangement constructed according to the invention has been discussed in conjunction with a water faucet, but such a sealing arrangement can be employed or applied in other fixtures or fittings and, in general, wherever two portions or parts having flow channels or ducts aligned to each other in the direction of flow have to be interfacingly sealed against one another. It is thus worthy of mention that the supporting or back-up ring 68 does not have to be formed at such portions or parts. The supporting or back-up ring 68 can just as well embrace the annular seal 20 as an independent ring or ring member.

While there are shown and described present preferred embodiments of the invention, it is to be distinctly understood that the invention is not limited thereto, but may be otherwise variously embodied and practiced within the scope of the following claims.

Accordingly, what I claim is:

1. A sealing arrangement, comprising:
   an annular elastically deformable seal through which flows a free-flowing medium;
   said annular seal having end sealing surfaces and an essentially cylindrical internal side;
   said annular seal comprising circumferential supporting ribs arranged at the regions of said end sealing surfaces and projecting outwardly in a radial direction;
   a supporting ring;
   said supporting ribs being supported at said supporting ring; and
   a resilient inner ring which bears at said internal side against said annular seal.

2. The sealing arrangement as defined in claim 1, wherein:
   said supporting ribs define a substantially V-shaped circumferential groove.

3. The sealing arrangement as defined in claim 1, wherein:
   said supporting ribs define a substantially U-shaped circumferential groove.

4. The sealing arrangement as defined in claim 1, wherein:
   said inner ring constitutes a slit spring washer.

5. The sealing arrangement as defined in claim 1, wherein:
   said annular seal comprising at said internal side at least one detent groove for said inner ring.

6. The sealing arrangement as defined in claim 1, wherein:
   said annular seal comprising at said internal side at least one detent lug for said inner ring.

7. A faucet comprising:
   a housing including an axial inlet end having an inside surface and including a radial outlet;
   a fixed disk and a rotatable disk situated adjacent to each other within the housing between the inlet end and outlet, each disk including at least one opening;
   an actuating member coupled to the rotatable disk for rotating the rotatable disk with respect to the fixed disk to adjust the overlapping relationship of the disk openings; and
   a sealing arrangement situated between the fixed disk and the housing axial inlet for coupling to a source of a fluid medium, the sealing arrangement comprising:
   an annular elastically deformable seal including end sealing surfaces, an essentially cylindrical internal side through which the fluid medium can flow, and circumferential supporting ribs projecting radially outward adjacent the end sealing surfaces; and
   a resilient inner ring bearing against the internal side of the deformable seal to ensure contact between the circumferential supporting ribs and said axial inlet inside surface.

8. The combination as defined in claim 7, wherein:
   said fixed disk and said rotatable disk are formed of ceramic material.

9. The faucet of claim 7 further comprising a lower portion including an opening and a valve seat in the opening having an upper surface, an end sealing surface of the sealing arrangement contacting the valve seat upper surface.

* * * * *